United States Patent
Yabe et al.

[11] Patent Number: 6,004,039
[45] Date of Patent: Dec. 21, 1999

[54] LUBRICATING STRUCTURE FOR OIL SEALS ASSEMBLED WITH BEARINGS

[75] Inventors: Toshikazu Yabe; Fumio Ueki; Hiroji Etoh, all of Kanagawa, Japan

[73] Assignee: NSK Ltd., Tokyo, Japan

[21] Appl. No.: 08/639,948

[22] Filed: Apr. 26, 1996

[30] Foreign Application Priority Data

Apr. 26, 1995 [JP] Japan ..................................... 7-102511
Feb. 23, 1996 [JP] Japan ..................................... 8-036739

[51] Int. Cl.$^6$ ............................. F16C 19/00; F16C 33/76
[52] U.S. Cl. ......................... 384/463; 384/477; 384/913; 277/394
[58] Field of Search .................................... 384/477, 462, 384/463, 476, 484, 486, 467, 480, 151, 148, 913; 277/58, 152, 153, 394, 358

[56] References Cited

U.S. PATENT DOCUMENTS

| | | | |
|---|---|---|---|
| 4,169,605 | 10/1979 | Nishimoto et al. | 277/549 |
| 4,198,584 | 4/1980 | Otto | 384/148 |
| 4,493,490 | 1/1985 | Ohma | 277/572 |
| 5,110,143 | 5/1992 | Hibbetts | 277/549 |
| 5,387,040 | 2/1995 | Firestone et al. | 277/549 |

FOREIGN PATENT DOCUMENTS

| | | | |
|---|---|---|---|
| 632837 | 4/1994 | Japan | F16J 15/16 |
| 7-54844 | 2/1995 | Japan | 384/462 |
| 2045365 | 10/1980 | United Kingdom | 384/463 |

*Primary Examiner*—Tamara L. Graysay
*Assistant Examiner*—Matthew A. Kaness
*Attorney, Agent, or Firm*—Sughrue, Mion, Zinn, Macpeak & Seas, PLLC

[57] ABSTRACT

In a structure for lubricating an oil seal interposed between a shaft and an outer circumferential member that surrounds the shaft, a bearing device provides: a shaft rotatable; an outer case surrounding the shaft and including a large-diameter portion, a medium-diameter portion, a small-diameter portion, and a contact portion connecting the medium-diameter portion and the small-diameter portion; a bearing assembly disposed in the large-diameter portion for supporting the shaft; an oil seal assembly interposed between the shaft and the outer case and contacting the medium-diameter portion and the contact portion; and a lubricant-containing member fitted to the oil seal assembly and molded plastically in an annular shape out of a resinous material containing a lubricant. The structure improved by the bearing device ensures satisfactory lubricating effects in a consistent manner.

9 Claims, 13 Drawing Sheets

LUBRICATING STRUCTURE FOR OIL SEALS ASSEMBLED WITH BEARINGS

BACKGROUND OF THE INVENTION

The present invention relates to a structure for lubricating lips of oil seal assemblies that are typically used in combination with vehicular bearings on wheel shafts of electric cars for railway and the like.

FIG. 13 shows an oil seal assembly 1 with gutter spring which is a conventional type of oil seal assemblies for use in combination with vehicular bearings. The oil seal assembly 1 has a dust lip 11a and a main lip 11b that has a gutter spring 13 fitted on the outer circumference. It is a general manner that the oil seal assembly 1 is mounted by inserting it between a shaft S and a seal case 2 and then press-fitting a spring cover 3 into the space between the seal case 2 and an engaging portion 12a of a metal ring 12. The oil seal assembly 1 thus mounted has friction and wear occurring between the main lip 11b and the shaft S but the lubrication between these parts is not necessarily adequate since it relies on a small amount of the lubricant exuding out of a bearing J.

Unexamined Japanese Utility Model Publication No. Hei 6-32837 has proposed an oil seal assembly that provides a pair of metal rings that have portions engaging each other and that are disposed away from each other with a predetermined axial space in the axial direction and two rubber lips that are fixed to the inner peripheral edges of the associated metal rings. The axial space between the two metal rings is filled with plastic grease to supply a lubricant to the lips because the lubricant exudes out of the plastic grease.

This proposed manner, however, has the problem that it is unable to ensure satisfactory lubricating effects in a consistent manner for two primary reasons; i) an exuding point of the lubricant is away from the shaft; ii) grease filling and refilling operations are difficult to perform.

SUMMARY OF THE INVENTION

The present invention has been accomplished under conventional circumstances and has an object of providing an improved structure for lubricating the lips of an oil seal assembly interposed between a shaft and an outer circumferential member that surrounds the shaft, which structure ensures satisfactory lubricating effects in a consistent manner.

This object of the invention can be attained by a bearing device which provides: a shaft rotatable; an outer case surrounding the shaft and including a large-diameter portion, a medium-diameter portion, a small-diameter portion, and a contact portion connecting the medium-diameter portion and the small-diameter portion; a bearing assembly disposed in the large-diameter portion for supporting the shaft; an oil seal assembly interposed between the shaft and the outer case and contacting the medium-diameter portion and the contact portion; and a lubricant-containing member fitted to the oil seal assembly and molded plastically in an annular shape out of a resinous material containing a lubricant.

In order to fix the lubricant-containing plastically molding member to the outer circumferential member surrounding the shaft, it may be fixed directly to a seal case corresponding to the outer circumferential member. Alternatively, in the case where a spring cover is interposed between the oil seal assembly and the seal case, the plastically molding member may be fixed to the spring cover.

DESCRIPTION OF THE PREFERRED EMBODIMENTS

Figure 1:
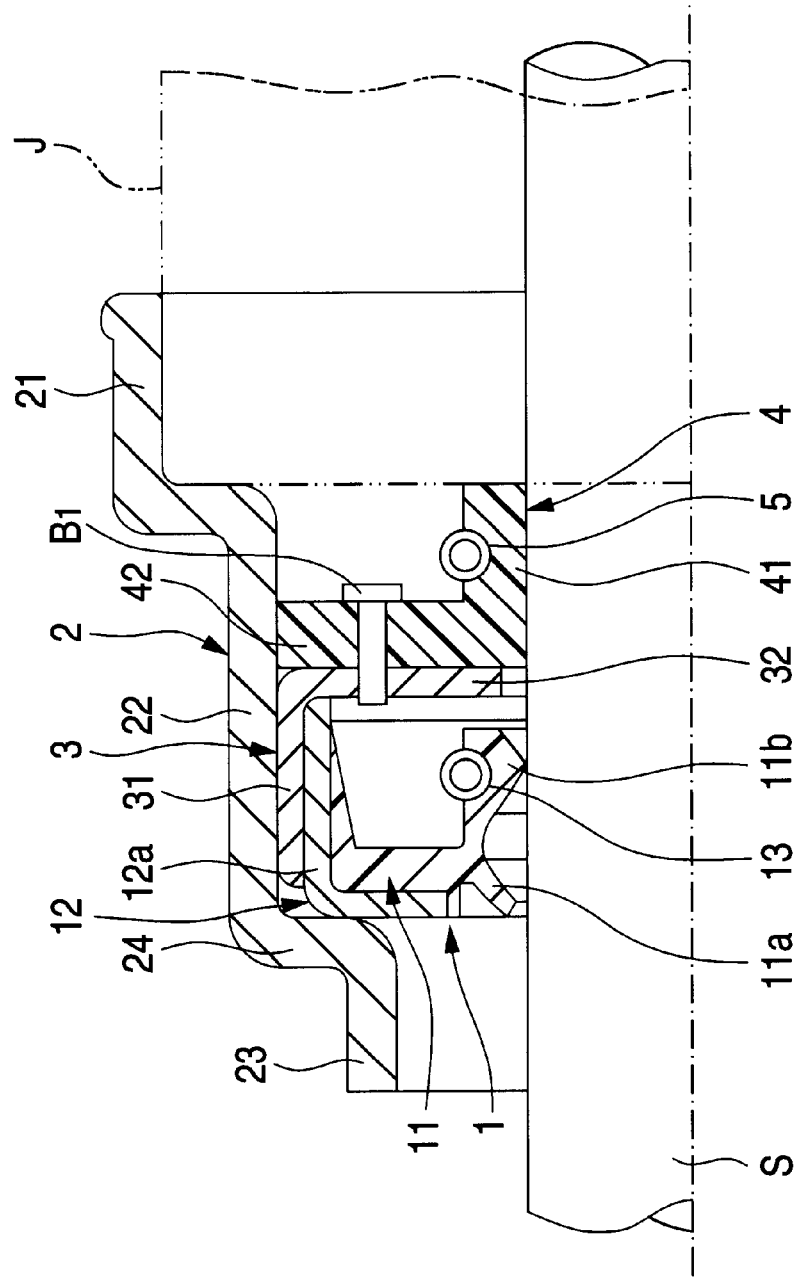
FIG. 1 is a sectional view showing a first embodiment of the structure of the invention for lubricating the lips of an oil seal assembly.

A structure according to the present invention for lubricating lips of oil seals assembled with bearings is mainly provided with a lubricant-containing plastically molding member. The structure of the invention will be described later in more detail.

To produce the lubricant-containing plastically molding member, a polymer selected from the group of polyolefinic polymers such as polyethylene, polypropylene, polybutylene and polymethylpentene is mixed with a lubricant selected from the group of paraffinic hydrocarbon oils such as poly($\alpha$-olefin) oils, naphthenic hydrocarbon oils, mineral oils, ether oils such as dialkyldiphenyl ethers, and ester oils such as phthalates and trimellitates, and the mixture is heated to melt, with the melt being then injected into a given metal mold under pressure and cooled to solidify. The lubricant-containing plastically molding members are manufactured by compression molding or injection molding.

The polymers listed above have average molecular weights ranging from $1 \times 10^3$ to $5 \times 10^6$ and among such polymers, those having relatively low molecular weights in the range from $1 \times 10^3$ to $1 \times 10^5$ and those having ultra-high molecular weights in the range from $1\times10^6$ to $5\times10^6$ are used as starting polymers either individually or in admixture in consideration of the moldability and the rigidity of the molding members.

With a view to providing higher mechanical strength, the lubricant-containing plastically molding member may contain one or more additional polymers selected from the following thermoplastic and thermosetting resins. Exemplary thermoplastic resins that can be added include polyamides, polycarbonates, polybutylene terephthalate, polyphenylene sulfide, polyethersulfones, polyetheretherketones, polyamideimide, polystyrene, ABS resins, or the like. Exemplary thermosetting resins that can be added include unsaturated polyester resins, urea resins, melamine resins, phenolic resins, polyimide resins, epoxy resins, or the like. In order to have these additional resins dispersed more uniformly in the polyolefinic polymers, compatibilizers may be added as required for molding.

The lubricant-containing plastically molding member may further contain various additives such as oxidation inhibitors, rust-preventive agents, antiwear agents, defoaming agents and extreme pressure agents.

The relative proportions of the polyolefinic polymer and the lubricant in the lubricant-containing plastically molding member are preferably such that the polymer is contained in an amount of 20–90 wt %, with the lubricant in an amount of 10–80 wt %. If the polymer content is less than 20 wt %, the molding member does not have the necessary strength. If the polymer content exceeds 90 wt % (i.e., the content of the lubricant is less than 10 wt %), the supply of the lubricant is insufficient.

In the bearings of wheel shafts for railway cars, electric charges tend to be stored on the metallic shaft and shaft case (seal case) due primarily to the leakage current from the electric motor and other equipment. When the stored charges are discharged, the charges pass through the bearing between the shaft and the seal case to cause electrolytic corrosion of the bearing so that a life of the bearing reduces considerably. In order to prevent this problem, conductive fillers are preferably incorporated in the lubricant-containing plastically molding member. Exemplary conductive fillers that can be incorporated in the plastically molding member include: metals such as silver, copper and aluminum; metallic oxides such as aluminum-doped zinc oxide, antimony-doped tin oxide coated barium sulfate, antimony-doped tin oxide coated aluminum borate, antimony-doped tin oxide coated titanium oxide, antimony-doped tin oxide, nitrogen-doped titanium oxide, antimony-doped tin oxide coated potassium titanate and carbon-coated potassium titanate; and carbonaceous materials such as oil furnace black, acetylene black, graphite and carbon fibers. These conductive fillers are advantageously whiskers or needles having high aspect ratios.

The conductive fillers are suitably added in amounts of 10–40 wt % of the total weight of the lubricant-containing plastically molding member. To prevent the electrolytic corrosion of the bearing, the volume resistivity of the plastically molding member is preferably lowered to $10^7$ Ω·cm or less by addition of the conductive fillers. More preferably, the volume resistivity of the plastically molding member is reduced to $10^5$ Ω·cm or less.

As already mentioned, the lubricating structure of the invention has the lubricant-containing plastically molding member fixed either to the outer circumferential member that surrounds the shaft or to the shaft itself. In the former case, the frictional heat that is generated between the plastically molding member and the shaft due primarily to the rotation of the shaft assists the lubricant to exude out of the plastically molding member. The lubricant flows over the surface of the shaft to be supplied to the interface between the shaft and each lip, so that consistent and adequate lubrication of the lips are secured. In the case where the plastically molding member is fixed directly to the shaft, the exuding lubricant also flows over the surface of the shaft to be supplied to the interface between the shaft and each lip, so that the consistent lubrication of the lips are secured.

Preferred embodiments of the invention will now be described regarding the structure for lubricating the lips of an oil seal assembly with reference to FIGS. 1 to 12.

In the lubricating structure according to a first embodiment shown in FIG. 1, the oil seal assembly 1 is interposed between a rotating shaft S and a surrounding cylindrical tubular seal case 2 (i.e., the outer circumferential member), with the shaft S being rotatably supported on the stator side (not shown) via a bearing J. The seal case 2 includes a large-diameter portion 21 receiving an axial end portion of the outer race of the bearing J by the inner circumference, a medium-diameter portion 22 that has a smaller diameter than the portion 21 and mounts the oil seal assembly 1, a small-diameter portion 23 which has a smaller diameter than the portion 22, and a contact portion 24 that connects the medium-diameter portion 22 and the small-diameter portion 23 and contacts an end portion of the oil seal assembly 1.

The oil seal assembly 1 is of a type that is fitted with a gutter spring and includes a rubber member 11 having a dust lip 11a and a main lip 11b, a metal ring 12 having an inverted L-shaped cross section that is fixed to the outer surface of the rubber member 11, and a gutter spring 13 that is fitted around the main lip 11b. The shaft S and the seal case 2 are both metallic.

To fix the oil seal assembly 1 in position, it is first inserted into the seal case 2 from the bearing J side and the metal ring 12 is brought into contact with the contact portion 24 of the seal case 2 such that the oil seal assembly is contained in the medium-diameter portion 22 and thereafter a spring cover 3 is press-fitted into the space between the seal case 2 and an engaging portion 12a which forms the outer circumference of the metal ring 12.

The spring cover 3 is an annular member that has an inverted L-shaped cross section which is similar to the cross section of the metal ring 12 of the oil seal assembly 1. The spring cover 3 includes an engaging portion 31 forming its outer circumference and a covering portion 32 in the form of an inward flange. The engaging portion 31 is press-fitted into the space between the engaging portion 12a of the metal ring 12 and the seal case 2, whereas the lubricant-containing plastically molding member 4 is fixed to the covering portion 32.

The plastically molding member 4 is an annular member having an L-shaped cross section that is molded from either one of the formulations set forth below under the conditions also specified below. The thickness of the plastically molding member is about three times the thickness of the metal ring 12 (but not limited to the thickness). As shown, the plastically molding member 4 includes a cylindrical tubular inner circumferential portion 41 and an outer circumferential portion 42 that is formed at an end face of the portion 41 and assumes the shape of an outward flange. The inside diameter of the inner circumferential portion 41 is equal to the diameter of the shaft S whereas the outside diameter of the outer circumferential portion 42 is equal to the inside diameter of the medium-diameter portion 22 of the seal case 2.

The plastically molding member 4 is positioned in such a way that the outer circumferential portion 42 contacts the covering portion 32 of the spring cover 3 and it is directly fixed to the spring cover 3 by screws B, that are threaded from the outer lateral surface of the outer circumferential portion 42 to penetrate the covering portion 32 in such a way that it is secured to the medium-diameter portion 22 of the seal case 2 via the spring cover 3. The outer circumference of the shaft S is in contact with the inner circumference of the inner circumferential portion 41 of the lubricant-containing plastically molding member 4. In the first embodiment under consideration, a gutter spring 5 is fitted on the outer circumference of the inner circumferential portion 41 and it has sufficient elasticity to ensure that the inner circumference of the plastically molding member 4 positively contacts the shaft S.

Formulation 1

| Polyolefinic polymers: | |
| --- | --- |
| MIPERON (registered trademark) XM220, ultra-high molecular weight polyethylene of Mitsui Petrochemical Industries, Ltd. | 9 wt % |
| PZ5OU, low-molecular weight polyethylene of Mitsubishi Petrochemical Co., Ltd. | 21 wt % |
| Lubricant: | |
| FBK oil "RO100", paraffinic mineral oil of Nippon Oil Co., Ltd. | 50 wt % |
| Conductive filler: | |
| DONACARBO (registered trademark) MILLED SG-244A, graphitized milled carbon fiber of DONAK Co., Ltd. | 20 wt % |
| Molding conditions: | |
| Molding method | : injection molding (in-line screw type) |
| Metal mold temperature | : 70° C. |
| Resin temperature | : 170° C. |
| Molding pressure | : 400 kg/cm$^2$ |

Formulation 2

| Polyolefinic polymers: | |
| --- | --- |
| TPX (registered trademark) DX-845, poly(4-methylpentene-1) of Mitsui Petrochemical Industries, Ltd. | 20 wt % |
| MIPERON (registered trademark) XM220, ultra-high molecular weight polyethylene of Mitsui Petrochemical Industries, Ltd. | 5 wt % |
| Lubricant: | |
| MOLESCO HI-LUBE (trade name) LBX-100, dialkyl diphenyl ether of Matsumura Research Corp. | 60 wt % |
| Conductive fillers: | |
| KETCHEN BLACK (trade name) 600JD, conductive filler of Lion Corp. | 4 wt % |
| KUREKA (trade name) M-102S, carbon fiber of Kureha Chemical Industry Co., Ltd. | 11 wt % |
| Molding conditions: | |
| Molding method | : injection molding (in-line screw type) |
| Metal mold temperature | : 70° C. |
| Resin temperature | : 250° C. |
| Molding pressure | : 400 kg/cm$^2$ |

In the lubricating structure according to the first embodiment of the invention, the lubricant exuding out of the lubricant-containing plastically molding member 4 first lubricates the surface of the shaft S and flows over the surface to spread in axially opposite directions, and the lubricant spreading toward the oil seal assembly is supplied consistently to the interface between the main lip 11b and the shaft S.

In addition, the frictional heating that occurs between the plastically molding member 4 and the shaft S due to the rotation of the shaft S assists the lubricant to exude out of the plastically molding member, thus assuring adequate lubrication of the main lip 11b.

Furthermore, the plastically molding member 4 which contains the conductive filler or fillers has sufficiently high conductivity to keep the metallic shaft S and seal case 2 shorted at all times. Therefore, it is hard to store electric charges between the two members. This in turn effectively protects the bearing J from electrolytic corrosion.

Yet another advantage of the first embodiment is that the plastically molding member 4 which is secured to the outside of the spring cover 3 can easily be replaced during maintenance.

Figure 2:
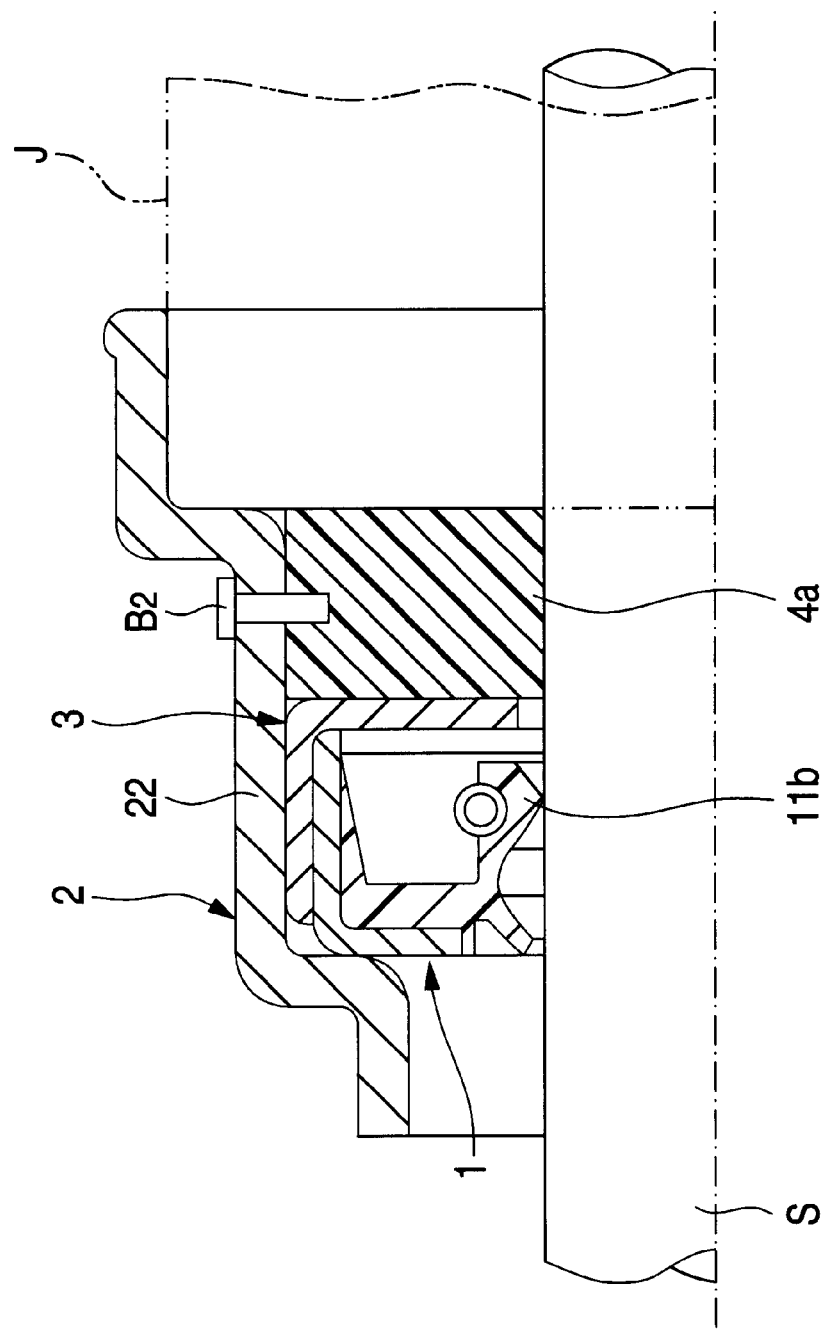
FIG. 2 is a sectional view showing a second embodiment of the structure of the invention for lubricating the lips of an oil seal assembly.

FIG. 2 is a sectional view showing a second embodiment of the structure of the invention for lubricating the lips of an oil seal assembly.

In the second embodiment, an oil seal assembly 1, as well as a shaft S and a cylindrical tubular seal case 2 between which the oil seal assembly 1 is interposed have the same structural features as in the first embodiment. The method of mounting the oil seal assembly 1, the shape of a spring cover 3 and the formulation of an annular lubricant-containing plastically molding member 4a are also the same as in the first embodiment. However, the two embodiments differ with respect to the shape and the positioning of the plastically molding member 4a.

As shown, the plastically molding member 4a is formed of a cylindrical tube having a length equal to the axial distance between the spring cover 3 and an end of the bearing J in the seal case 2. The inside diameter of the plastically molding member 4a is equal to the diameter of the shaft S whereas the outside diameter of the plastically molding member 4a is equal to the inside diameter of the medium-diameter portion 22 of the seal case 2.

The plastically molding member 4a is positioned by permitting an end face thereof to contact the covering portion 32 of the spring cover 3 and secured to the seal case 2 by screws B$_2$ which are threaded from the outside of the seal case 2 to penetrate its medium-diameter portion 22. The outer circumference of the shaft S is in contact with the inner circumference of the plastically molding member 4a.

Hence, as in the first embodiment, the lubricant exuding out of the plastically molding member 4a flows over the surface of the shaft S to be supplied consistently to the interface between the main lip 11b of the oil seal assembly 1 and the shaft S. In addition, the frictional heat that is generated due to the rotation of the shaft S assists the lubricant to exude out of the plastically molding member 4a. Therefore, the adequate lubrication of the main lip 11b is secured, with the added advantage of preventing the electrolytic corrosion of bearing J because of the conductive filler or fillers contained in the plastically molding member 4a.

It should also be mentioned that in the second embodiment, the plastically molding member 4a is secured by the screws that are threaded from the outside of the seal case 2 and this enables the plastically molding member 4a to be mounted more easily than in the first embodiment. As a further advantage, the plastically molding member 4a is of a greater size and hence permits longer-term lubrication than the plastically molding member 4 in the first embodiment.

Figure 3:
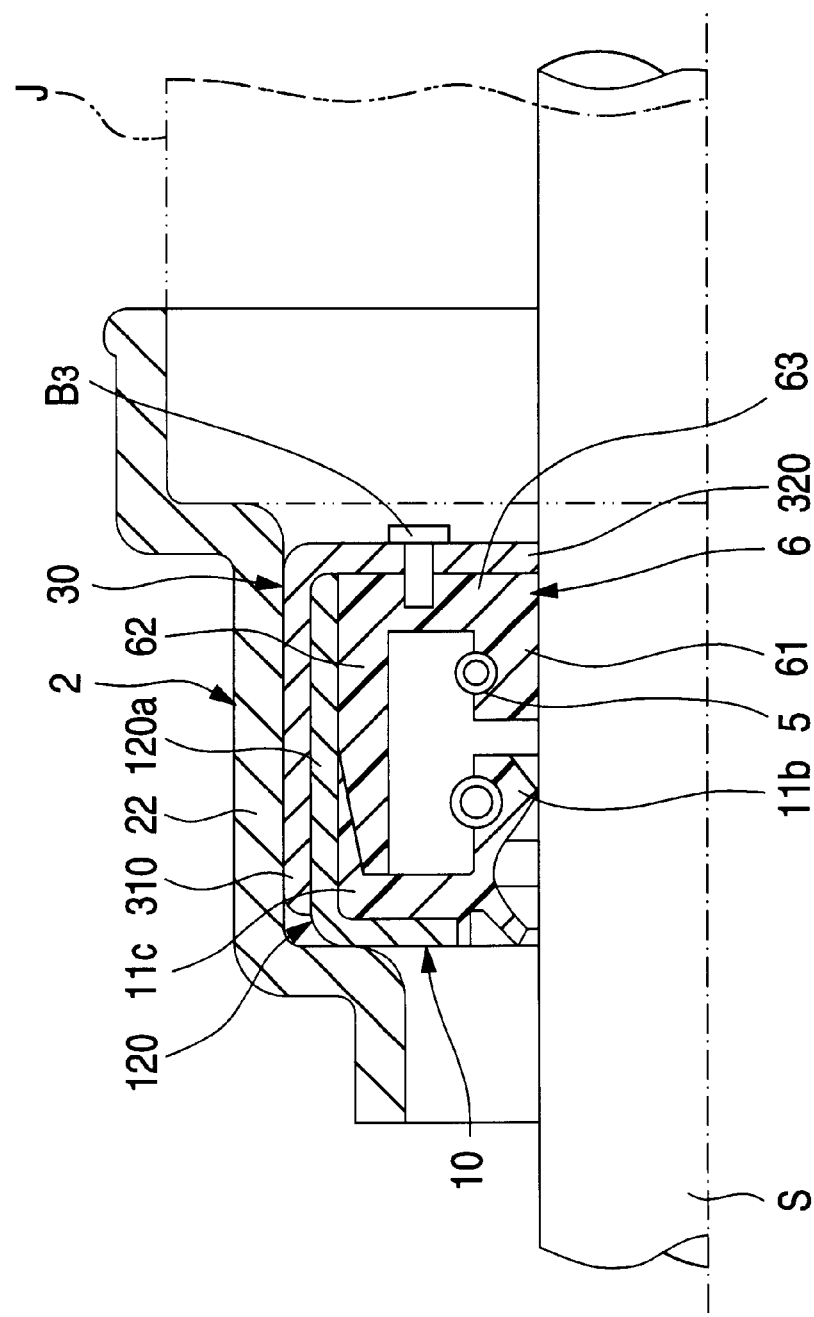
FIG. 3 is a sectional view showing a third embodiment of the structure of the invention for lubricating the lips of an oil seal assembly.

FIG. 3 is a sectional view showing a third embodiment of the structure of the invention for lubricating the lips of an oil seal assembly.

In the third embodiment, a shaft S and a cylindrical tubular seal case 2 between which an oil seal assembly 10 is interposed have the same structural features as in the first embodiment. The oil seal assembly 10 is of a type that is fitted with a gutter spring and the length of an engaging portion 120a of a metal ring 120 is about twice the value adopted in the first embodiment. An engaging portion 310 of a spring cover 30 is accordingly elongated. An annular lubricant-containing plastically molding member 6 is disposed in the space within the seal case 2 that is defined by the shaft S, the oil seal assembly 10 and the spring cover 30.

The plastically molding member 6 is an annular member that is an integral combination of an inner tubular portion 61 having an inner circumference that is fittable over the shaft S, an outer tubular portion 62 that is longer than the inner tubular portion 61 and has an outer circumference that is fittable within the engaging portion 120a of the oil seal assembly 10, and an annular portion 63 that is disposed between coaxially arranged inner and outer tubular portions 61 and 62 and that has an end face positioned flush with these tubular portions. The plastically molding member 6 is molded from the same formulations under the same conditions as in the first embodiment.

The plastically molding member 6 is disposed within the oil seal assembly 10 in such a way that the outer circumference of the outer tubular portion 62 is in contact with the inner surface of the engaging portion 120a, and the spring cover 30 is press-fitted into the seal case 2 in such a way that the inner surface of the covering portion 320 contacts the end face of the plastically molding member 6. The plastically molding member 6 is directly fixed to the spring cover 30 by screws $B_3$ that are threaded from the outside to penetrate the covering portion 320 to reach the annular portion 63 in such a way that it is secured to the medium-diameter portion 22 of the seal case 2 via the spring cover 30. A gutter spring 5 is fitted on the outer circumference of the inner tubular portion 61 and it has sufficient elasticity to ensure that the inner circumference of the plastically molding member 6 positively contacts the shaft S.

Hence, as in the first embodiment, the lubricant exuding out of the plastically molding member 6 flows over the surface of the shaft S to be supplied consistently to the interface between the main lip 11b of the oil seal assembly 10 and the shaft S; in addition, the frictional heat that is generated due to the rotation of the shaft S assists the lubricant to exude out of the plastically molding member 6. Therefore, the adequate lubrication of the main lip 11b is secured, with the added advantage of preventing the electrolytic corrosion of bearing J by the conductive filler or fillers contained in the plastically molding member 6.

Add to this, the plastically molding member 6 is positioned very close to the main lip 11b, thus ensuring more positive lubrication of the main lip 11b.

Figure 4:
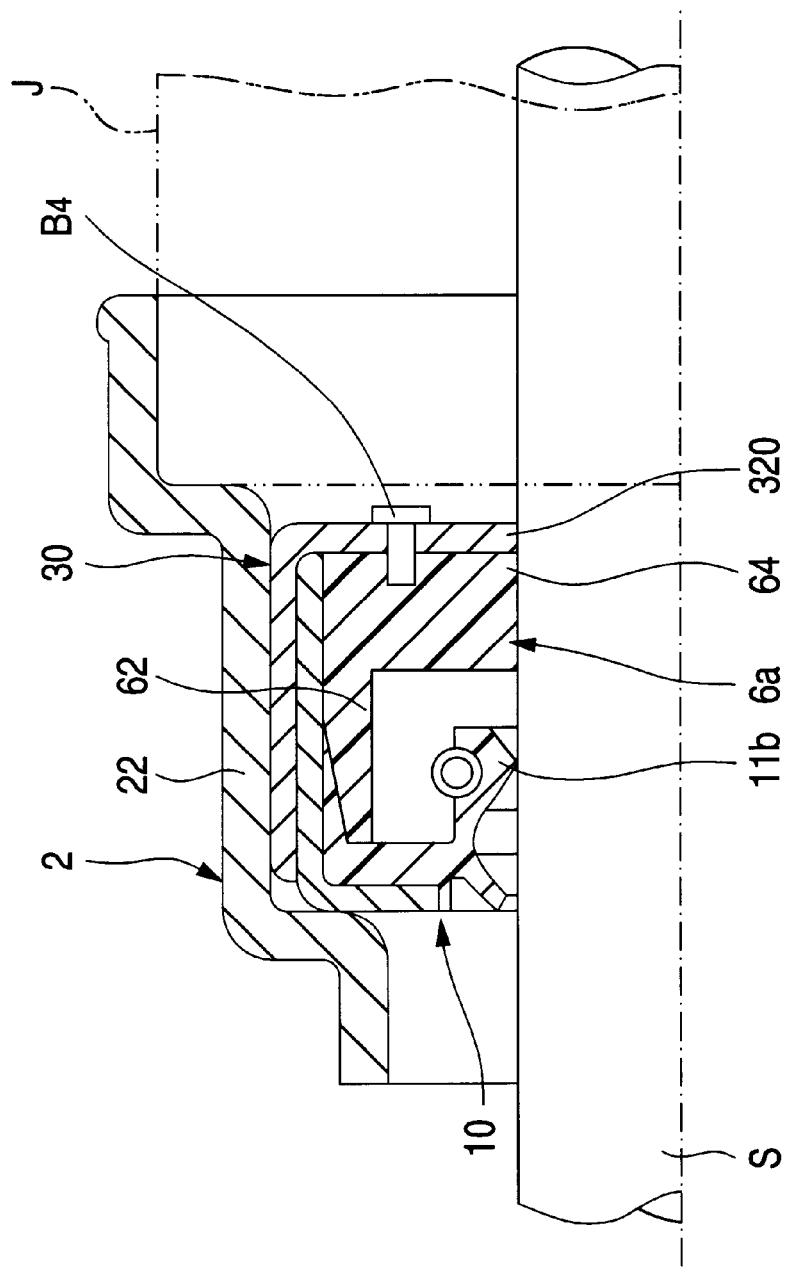
FIG. 4 is a sectional view showing a fourth embodiment of the structure of the invention for lubricating the lips of an oil seal assembly.

FIG. 4 is a sectional view showing a fourth embodiment of the structure of the invention for lubricating the lips of an oil seal assembly.

In the fourth embodiment, a shaft S and a cylindrical tubular seal case 2 between which an oil seal assembly 10 is interposed have the same structural features as in the first embodiment. The oil seal assembly 10 is of the same type as in the third embodiment and the method of mounting it, the shape of a spring cover 30 and the formulation of an annular lubricant-containing plastically molding member 6a are also the same as in the third embodiment. The only difference between the two embodiments concerns the shape of the plastically molding member 6a.

The plastically molding member 6a is such that the outer tubular portion 62 in the third embodiment combines integrally with an inner circumferential portion 64 in a cylindrical tubular form that has an inner circumference in contact with the outer circumference of the shaft S, as well as an end face in contact with the inner surface of the covering portion 320 of the spring cover 30. The plastically molding member 6a is directly fixed to the spring cover 30 by screws $B_4$ that are threaded from the outside to penetrate the covering portion 320 of the spring cover 30 to reach the inner circumferential portion 64 in such a way that it is secured to the medium-diameter portion 22 of the seal case 2 via the spring cover 30.

Hence, as in the first embodiment, the lubricant exuding out of the plastically molding member 6a flows over the surface of the shaft S to be supplied consistently to the interface between the main lip 11b of the oil seal assembly 10 and the shaft S; in addition, the frictional heat that is generated due to the rotation of the shaft S assists the lubricant to exude out of the plastically molding member 6a. Therefore, the adequate lubrication of the main lip 11b is secured, with the added advantage of preventing the electrolytic corrosion of bearing J by the conductive filler or fillers contained in the plastically molding member 6a.

Add to this, the plastically molding member 6a is positioned very close to the main lip 11b, thus ensuring more positive lubrication of the main lip 11b. As a further advantage, the plastically molding member 6a is of a greater size and hence permits longer-term lubrication than the plastically molding member 6 in the third embodiment.

Figure 5:
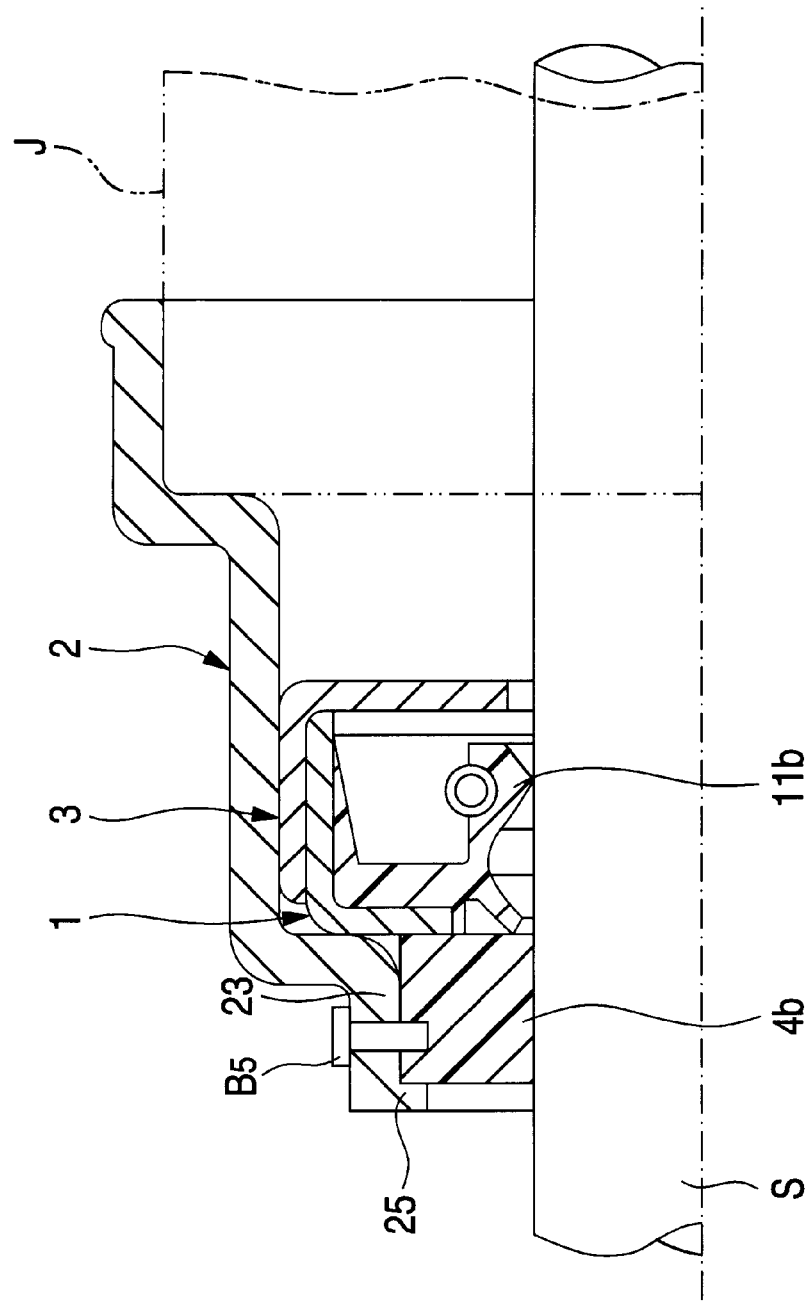
FIG. 5 is a sectional view showing a fifth embodiment of the structure of the invention for lubricating the lips of an oil seal assembly.

FIG. 5 is a sectional view showing a fifth embodiment of the structure of the invention for lubricating the lips of an oil seal assembly.

In the fifth embodiment, the structure of an oil seal assembly 1, the method of mounting it and the shape of a spring cover 3 are the same as in the first embodiment. The only difference between the two embodiments concerns the shape and the positioning of an annular lubricant-containing plastically molding member 4b, as well as the shape of the seal case 2.

As shown, the small-diameter portion 23 of the seal case 2 has an inward flange 25 formed in the end portion for receiving an end of the plastically molding member 4b.

The plastically molding member 4b is formed as a cylindrical tube having a length equal to the axial distance between the oil seal assembly 1 within the seal case 2 and the inward flange 25. The inside diameter of the plastically molding member 4b is equal to the diameter of the shaft S whereas the outside diameter of the plastically molding member 4b is equal to the inside diameter of the small-diameter portion 23 of the seal case 2.

Before mounting the oil seal assembly 1, the plastically molding member 4b is fitted into the small-diameter portion 23 of the seal case 2, with one end contacting the inward flange 25, and the plastically molding member 4b is then fixed to the seal case 2 by screws $B_5$ which are threaded from the outside to penetrate the small-diameter portion 23 in such a way that the outer circumference of the shaft S contacts the inner circumference of the plastically molding member 4b.

Hence, as in the first embodiment, the lubricant exuding out of the plastically molding member 4b flows over the surface of the shaft S to be supplied consistently to the interface between the main lip 11b of the oil seal assembly 1 and the shaft S; in addition, the frictional heat that is generated due to the rotation of the shaft S assists the lubricant to exude out of the plastically molding member 4b. Therefore, the adequate lubrication of the main lip 11b is secured, with the added advantage of preventing the electrolytic corrosion of bearing J by the conductive filler or fillers contained in the plastically molding member 4b.

Add to this, the plastically molding member 4b is positioned in the end portion of the seal case 2 which is remote from the bearing J and this offers the advantage that the plastically molding member 4b serves as a seal for assuring an enhanced sealing effect and that the operative state of the plastically molding member 4b can be easily checked from the outside.

Figure 6:
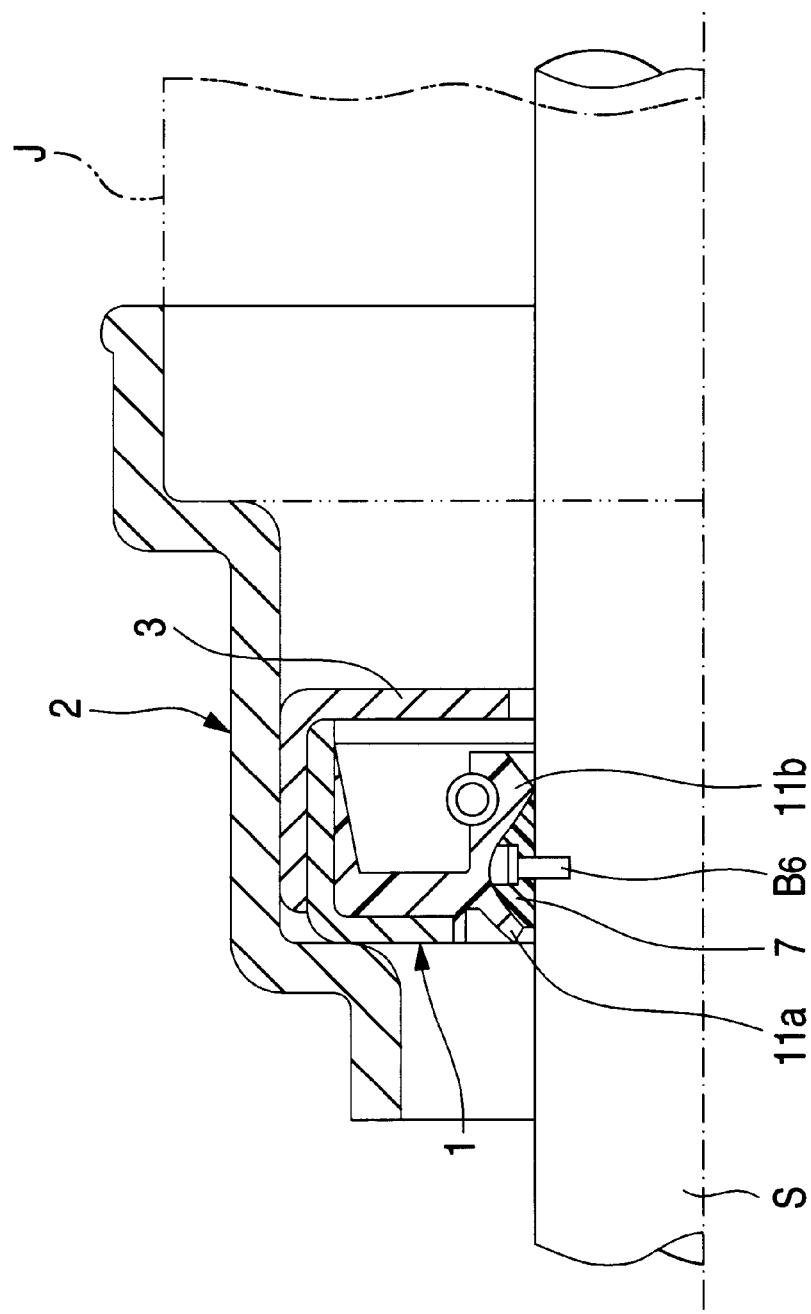
FIG. 6 is a sectional view showing a sixth embodiment of the structure of the invention for lubricating the lips of an oil seal assembly.

FIG. 6 is a sectional view showing a sixth embodiment of the structure of the invention for lubricating the lips of an oil seal assembly.

In the sixth embodiment, an oil seal assembly 1, as well as a shaft S and a cylindrical tubular seal case 2 between which the oil seal assembly 1 is interposed have the same structural features as in the first embodiment. The method of mounting the oil seal assembly 1 and the shape of a spring cover 3 are also the same as in the first embodiment. The only difference between the two embodiments concerns the shape, formulation and the positioning of an annular lubricant-containing plastically molding member 7.

As shown, the plastically molding member 7 is disposed within the space defined by the dust lip 11a and the main lip 11b of the oil seal assembly and by the shaft S. The plastically molding member 7 is an annular member which has an inside diameter equal to the diameter of the shaft S and which has two surfaces on the outer circumference that contact the dust lip 11a and the main lip 11b, respectively, with a recess being formed between the two surfaces for receiving the heads of mounting screws $B_6$.

The plastically molding member 7 is molded from the same formulations as in the first embodiment, except that the conductive filler or fillers are replaced by a correspondingly increased amount of the lubricant.

Before mounting the oil seal assembly 1, the plastically molding member 7 is secured to the shaft B by mounting screws $B_6$ and the oil seal assembly 1 is then installed around the plastically molding member 7.

Hence, as in the first embodiment, the lubricant exuding out of the plastically molding member 7 flows over the surface of the shaft S to be supplied consistently to the interface between the main lip 11b of the oil seal assembly 1 and the shaft S.

In addition, the plastically molding member 7 which is positioned in contact with the main lip 11b of the oil seal assembly 1 ensures adequate lubrication of the main lip 11b.

As a further advantage, the plastically molding member 7 is a smaller annular member and hence requires a lower materials cost than the plastically molding members used in the first to the fifth embodiment.

Figure 7:
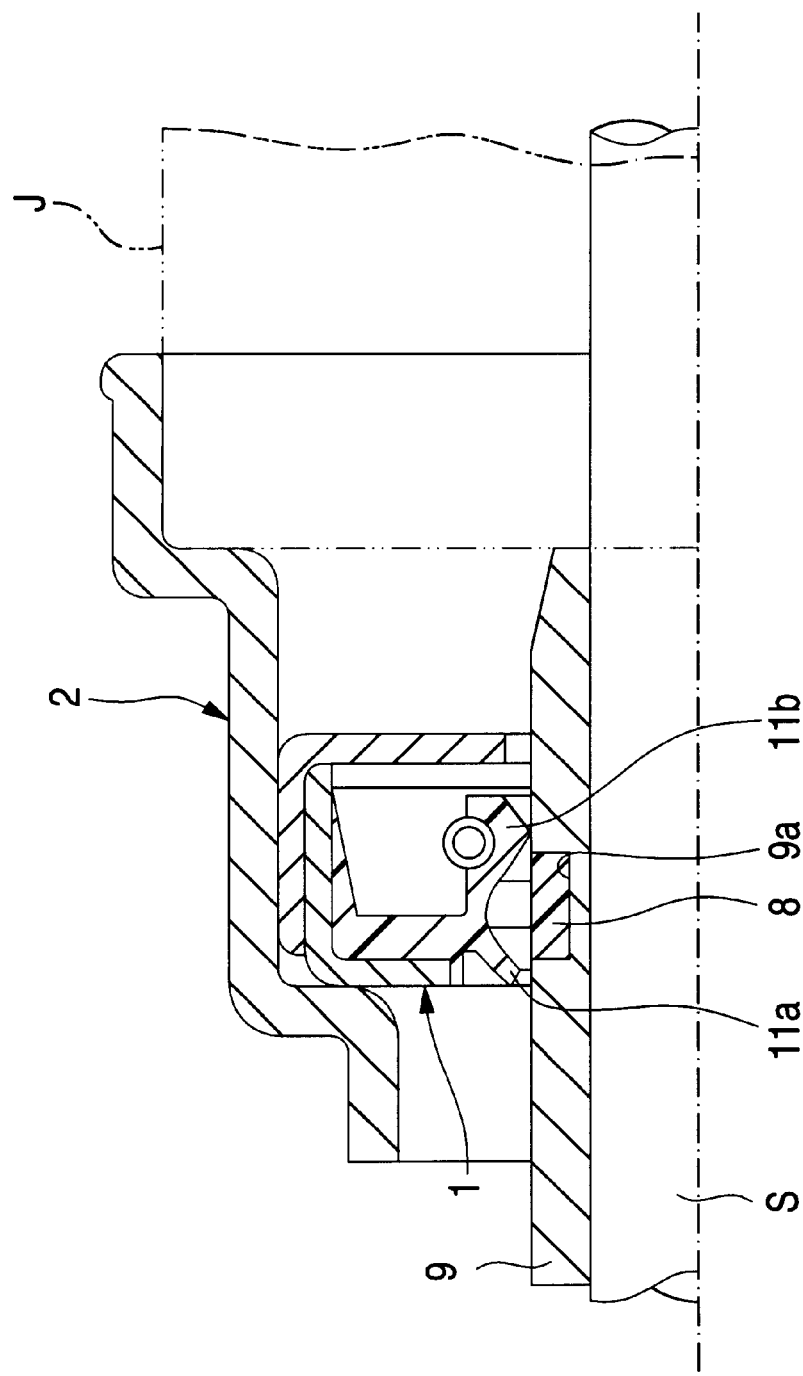
FIG. 7 is a sectional view showing a seventh embodiment of the structure of the invention for lubricating the lips of an oil seal assembly.

FIG. 7 is a sectional view showing a seventh embodiment of the structure of the invention for lubricating the lips of an oil seal assembly.

In the seventh embodiment, an oil seal assembly 1 and a seal case 2 have the same structural features as in the first embodiment; in addition, the method of mounting the oil seal assembly 1 and the shape of a spring cover 3 are also the same as in the first embodiment. However, the two embodiments differ with respect to the shape, formulation and the positioning of an annular lubricant-containing plastically molding member 8.

In addition, the part of the shaft S where the oil seal assembly 1 is mounted is covered with a tubular seal wear ring 9 for minimizing the wear of the shaft S, and the seal wear ring 9 has a circumferential groove 9a formed in the area that is bound by the dust lip 11a and the main lip 11b of the oil seal assembly 1 and the width of which is a little smaller than the axial distance between the two lips.

As shown, the plastically molding member 8 is formed as a cylindrical tube which has an outer circumference flush with that of the seal wear ring 9 and an inner circumference of the same diameter as that of the bottom surface of the circumferential groove 9a. The plastically molding member 8 is secured to the shaft S by being fitted into the circumferential groove 9a.

The plastically molding member 8 is molded from the same formulations as in the first embodiment, except that it does not contain conductive fillers.

Hence, as in the first embodiment, the lubricant exuding out of the plastically molding member 8 flows over the surface of the shaft S to be supplied consistently to the interface between the main lip 11b of the oil seal assembly 1 and the shaft S. In addition, the plastically molding member 8 is positioned sufficiently close to the main lip 11b of the oil seal assembly 1 that adequate lubrication of the main lip 11b is ensured.

Figure 8:
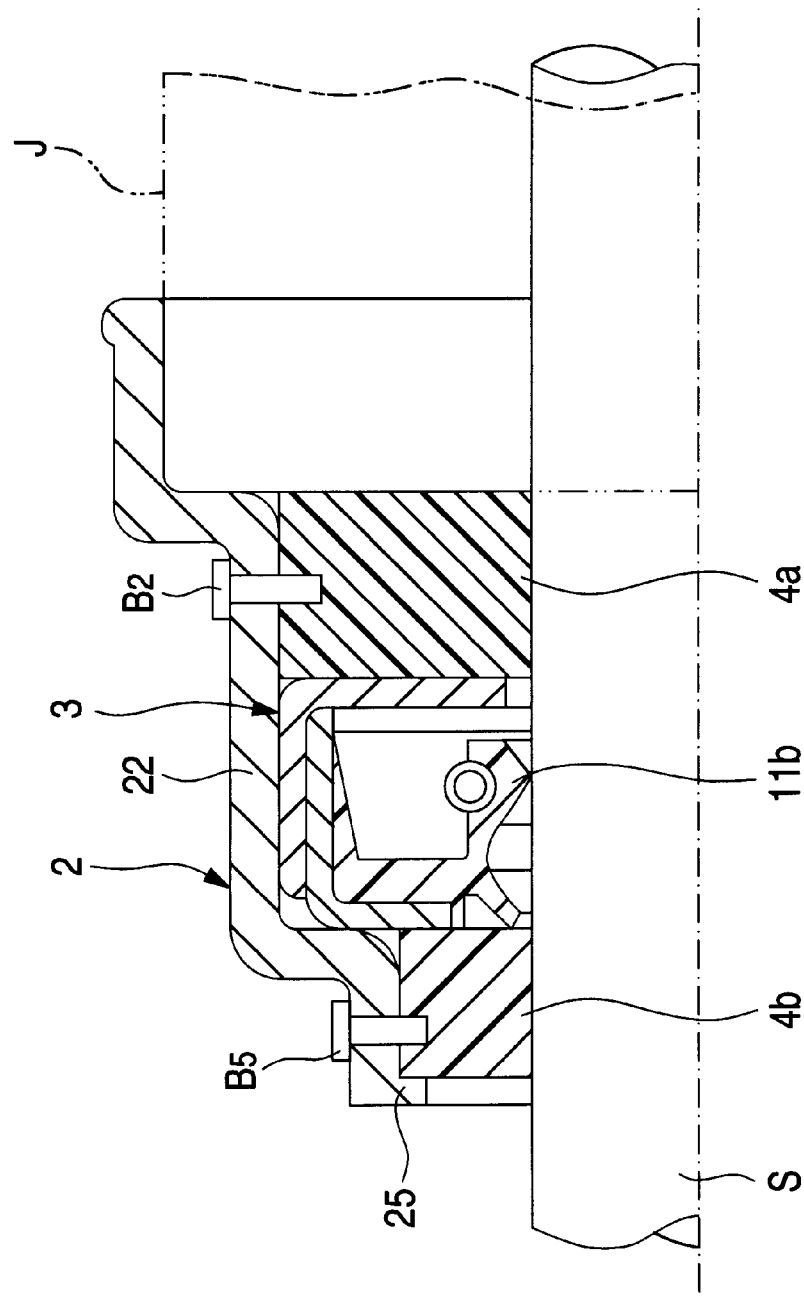
FIG. 8 is a sectional view showing an eighth embodiment of the structure of the invention for lubricating the lips of an oil seal assembly.

FIG. 8 is a sectional view showing an eighth embodiment of the structure of the invention for lubricating the lips of an oil seal assembly.

In the eighth embodiment, the structure of an oil seal assembly 1, the method of mounting it, the structural features of a shaft S and a seal case 2 between which the oil seal assembly 1 is interposed, the shape of a spring cover 3, as well as the formulation and the shape of an annular lubricant-containing plastically molding member 4b, and the method of mounting it are the same as in the fifth embodiment. However, the two embodiments differ in that an annular lubricant-containing plastically molding member 4a which is identical to what is used in the second embodiment is also provided in the eighth embodiment. Stated more specifically, two plastically molding members 4a and 4b are fitted on opposite sides of the oil seal assembly 1 in the axial direction of the shaft S.

Hence, the lubricating structure according to the eighth embodiment of the invention attains the advantages of both the second and the fifth embodiment; in addition, the combination of the two plastically molding members 4a and 4b further extends the period of time over which the main lip 11b can be lubricated while protecting the bearing J against electrolytic corrosion.

Figure 9:
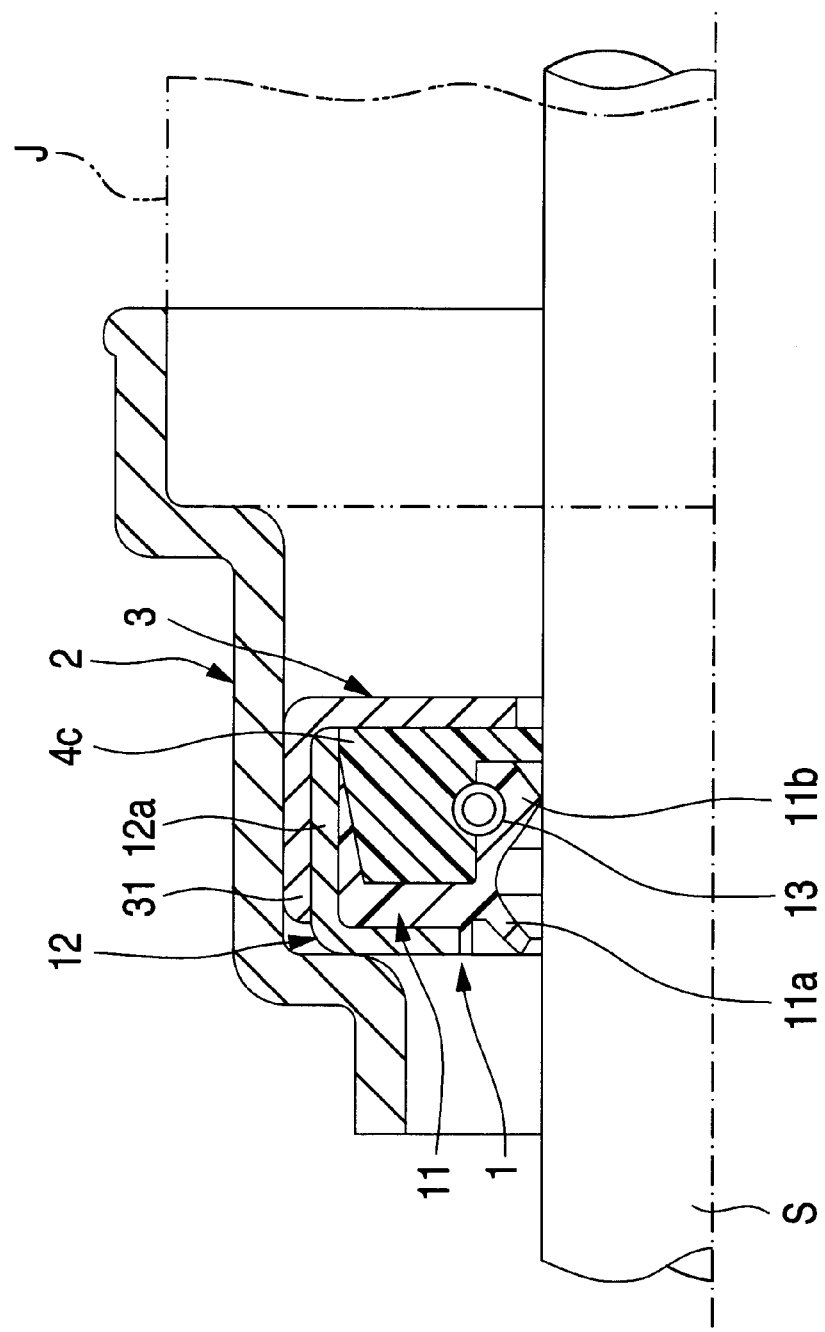
FIG. 9 is a sectional view showing a ninth embodiment of the structure of the invention for lubricating the lips of an oil seal assembly.

FIG. 9 is a sectional view showing a ninth embodiment of the structure of the invention for lubricating the lips of an oil seal assembly.

In the ninth embodiment, the structure of an oil seal assembly 1, the method of mounting it, the structural features of a shaft S and a seal case 2 between which the oil seal assembly 1 is interposed, the shape of a spring cover 3 and the formulation of an annular lubricant-containing plastically molding member 4c are the same as in the first embodiment. However, the two embodiments differ with respect to the shape and the positioning of the plastically molding member 4c.

As shown, the plastically molding member 4c is molded in such a shape that it undergoes elastic deformation when it is packed into the space defined by a rubber member 11 of the oil seal assembly 1, the spring cover 3 and the shaft S. For packing the plastically molding member 4c in the oil seal assembly 1, the latter is first placed in the seal case 2 and the plastically molding member 4c is then fitted into a recessed portion of the rubber member 11, followed by press-fitting an engaging portion 31 of the spring cover 3 into the space between an engaging portion 12a of a metal ring 12 and the seal case 2. As a result, the plastically molding member 4c is directly fixed to the spring cover 3, with it contacting the shaft S, in such a way that it is secured to the seal case 2 via the spring cover 3.

Hence, as in the previous embodiments, the lubricant exuding out of the plastically molding member 4c flows over the surface of the shaft S to be supplied continuously to the interface between the main lip 11b of the oil seal assembly 1 is and the shaft S. In addition, the plastically molding member 4c is positioned sufficiently close to the main lip 11b of the oil seal assembly 1 that adequate lubrication of the main lip 11b is ensured. As a further advantage, the plastically molding member 4c can be secured to the spring cover 3 without bolting and, hence, requiring less time than in the previous embodiments.

Figure 10:
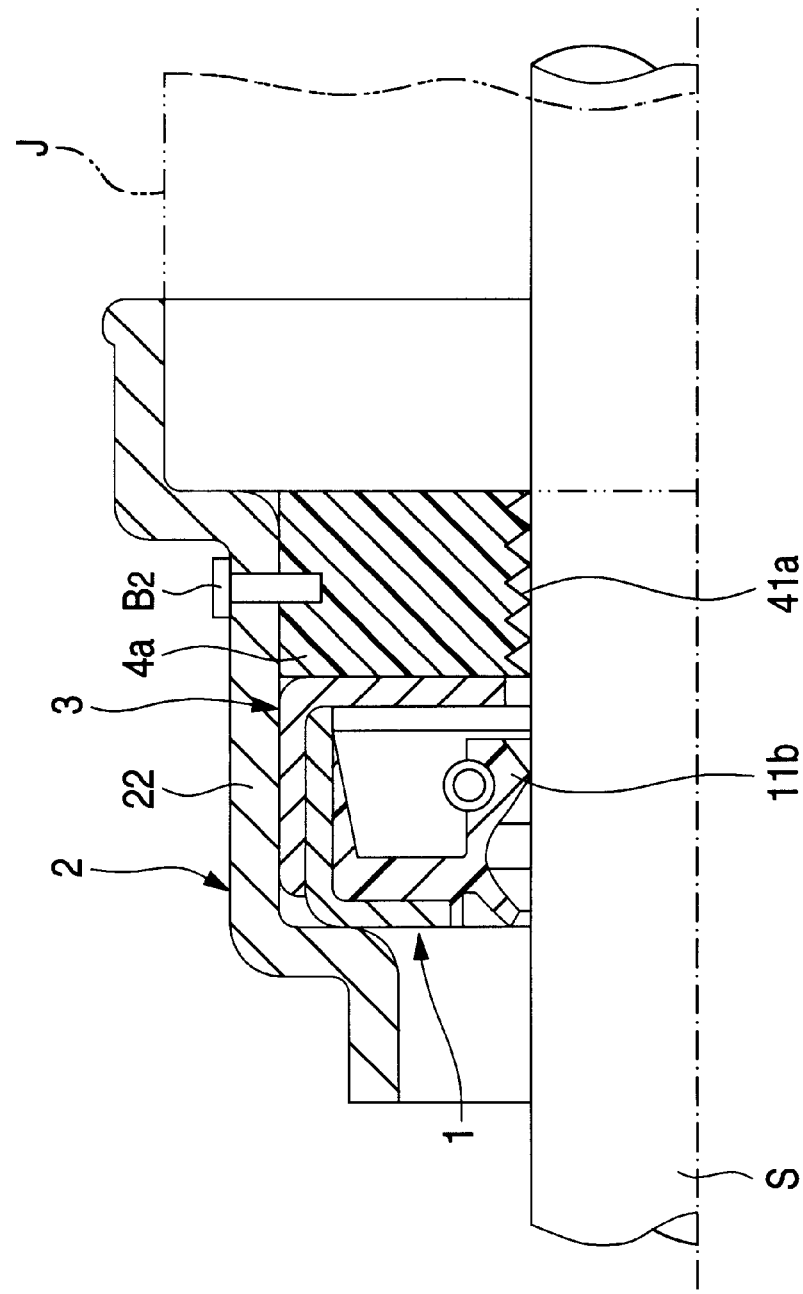
FIG. 10 is a sectional view showing a tenth embodiment of the structure of the invention for lubricating the lips of an oil seal assembly.
Figure 11:
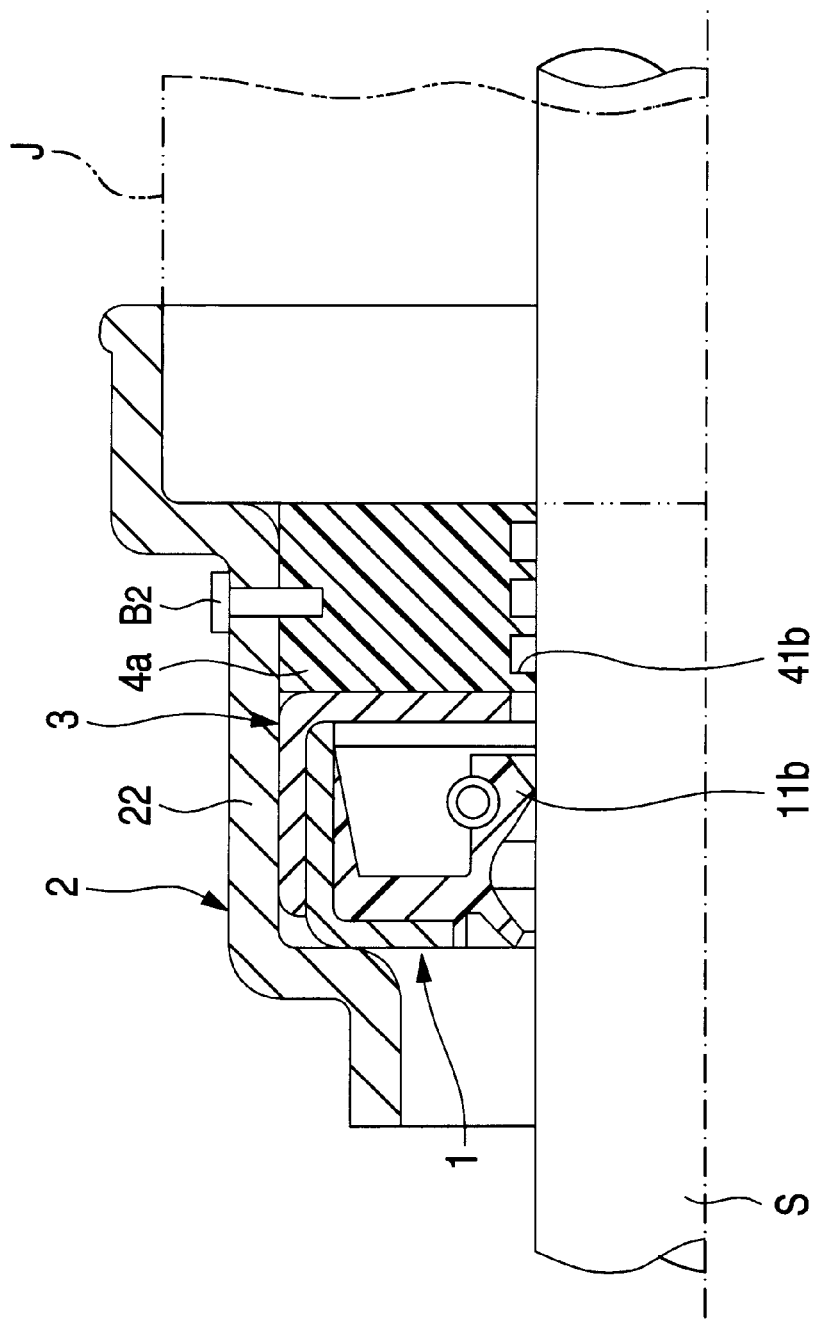
FIG. 11 is a sectional view showing an eleventh embodiment of the structure of the invention for lubricating the lips of an oil seal assembly.
Figure 12:
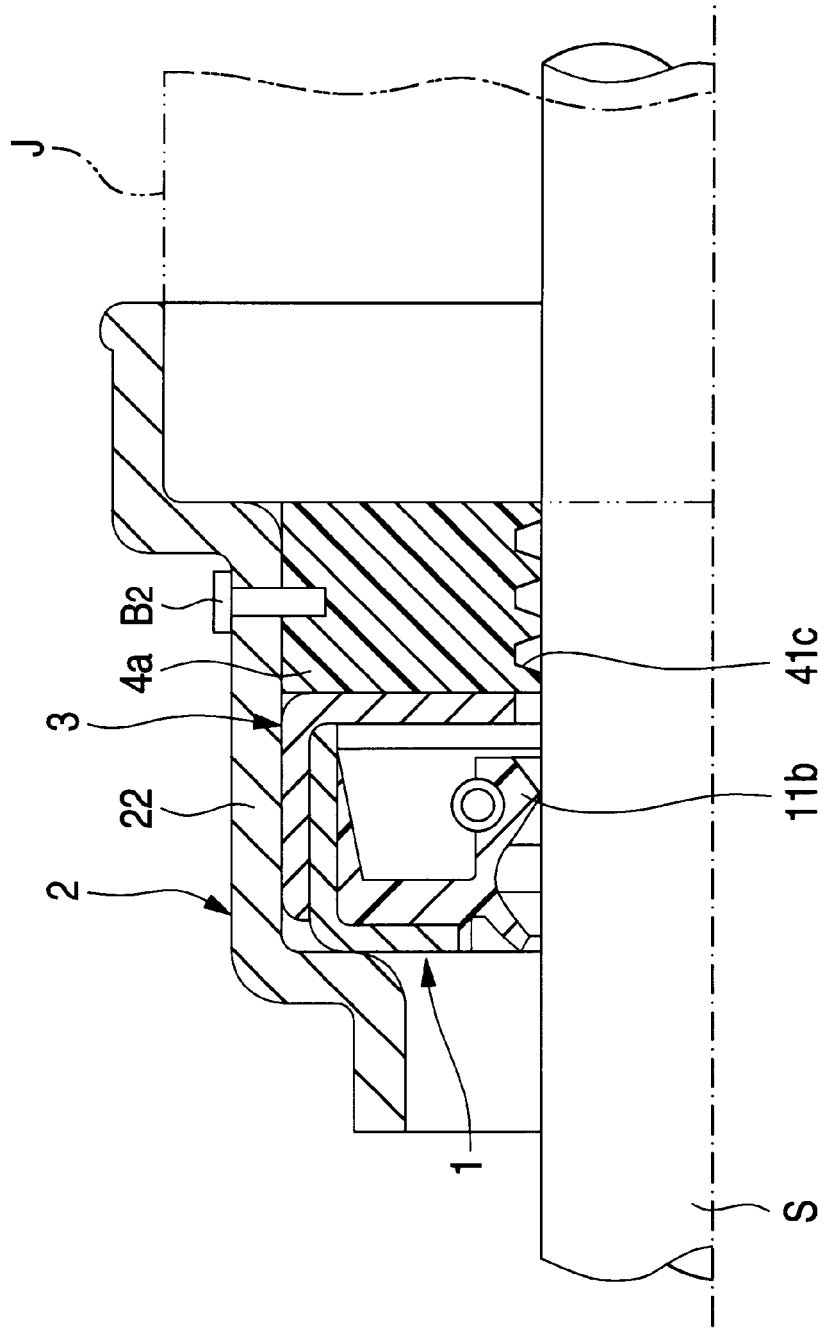
FIG. 12 is a sectional view showing a twelfth embodiment of the structure of the invention for lubricating the lips of an oil seal assembly.
Figure 13:
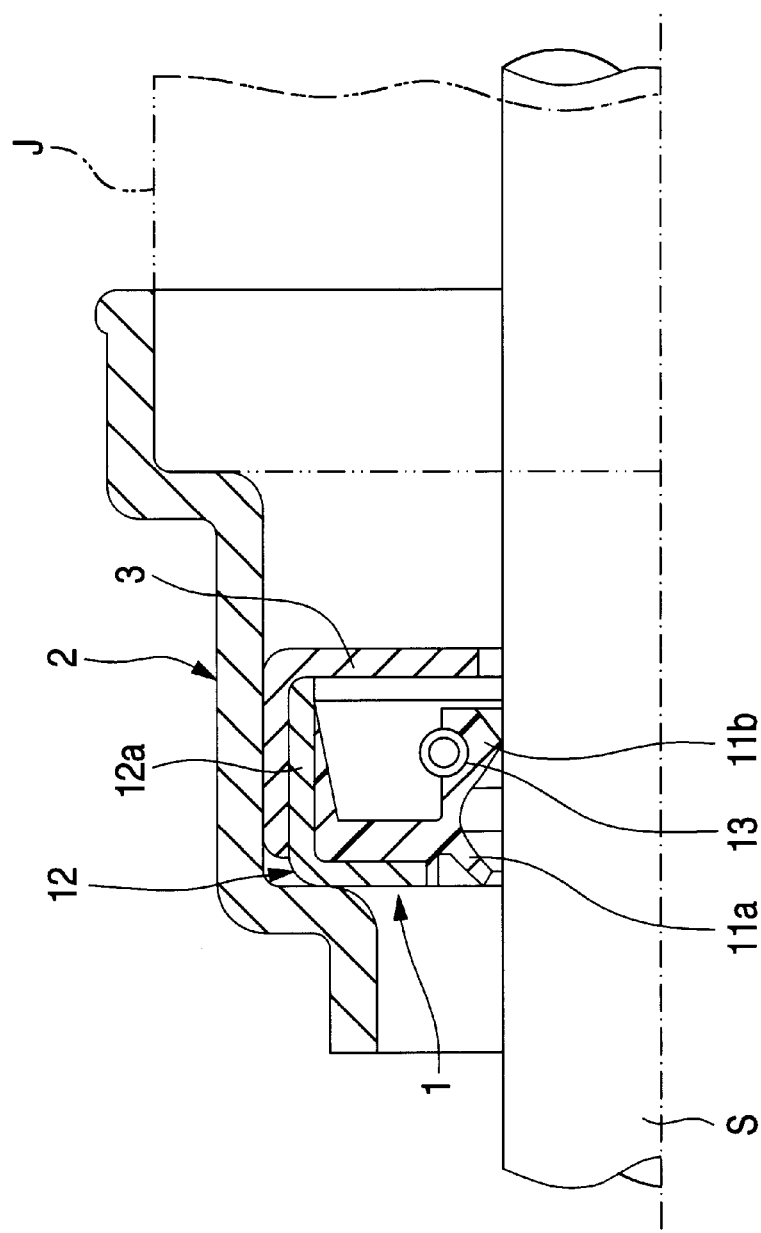
FIG. 13 is a sectional view showing an example of the conventional structure for mounting oil seal assemblies which are to be used in combination with vehicular bearings.

FIGS. 10–12 are sectional views showing a tenth to a twelfth embodiment of the structure of the invention for lubricating the lips of an oil seal assembly.

In these embodiments, various types of corrugated grooves are formed in the inner circumference of an annular lubricant-containing plastically molding member which is of the same type as used in the second embodiment. The grooves reduce the area over which the plastically molding member contacts the shaft S, thereby reducing the torque that would otherwise increase when the plastically molding member is mounted.

The circumferential grooves to be formed are not limited to any particular shapes and three typical examples are illustrated in FIGS. 10 to 12. Circumferential grooves 41a shown in FIG. 10 have triangular cross sections and each land between adjacent grooves has such a small width that the contact it makes with the shaft S is almost in a line; circumferential grooves 41b shown in FIG. 11 have rectangular cross sections and their lands make areal contact with the shaft S as bands of substantially the same width as the groove width; and circumferential grooves 41c shown in FIG. 12 are tapered and their width increases toward the shaft S such that their lands make areal contact with the shaft S as bands of a width which is a little smaller than the minimum groove width.

The lubricant-containing plastically molding members used in the first to the twelfth embodiment of the invention share the common feature that they are not heated for positioning and that therefore the main lip 11b of the oil seal assembly does not experience thermal deterioration during mounting operations.

The shape of the plastically molding member to be used in the invention is not limited to those employed in the previous embodiments and it may be any annular member that has an inner or outer circumference of an equal diameter to the shaft. In the case of an annular member having an inner circumference of an equal diameter to the shaft, the plastically molding member may be formed of two or more segments that have been split in a plane along the diameter of the inner circle or, alternatively, it may be provided with a cutout that extends axially from an end.

It should also be noted that the shaft to be used with the lubricating structure of the invention is in no way limited to the rotating shaft used in the foregoing embodiments.

As described above in detail, the structure of the invention for lubricating the lips of an oil seal assembly allows the lubricant to be supplied to the interface between the main lip and the shaft by flowing over the surface of the latter and this ensures consistent lubrication of the main lip.

What is claimed is:

1. A structure for lubricating an oil seal for use in combination with a bearing assembly comprising:

an outer case surrounding a rotatable member and engaged with said bearing assembly which is interposed between said rotatable member and said outer case so as to rotatably support said rotatable member;

an oil seal assembly interposed between said rotatable member and the outer case for sealing a space defined between said rotatable member and said outer case; and a lubricant-containing member molded plastically in an annular shape out of a resinous material containing a lubricant and mounted on at least one of said rotatable member and said outer case at a position adjacent to said oil seal assembly so as to supply said lubricant into said space;

wherein an inner peripheral surface of said annular-shaped lubricant-containing member is in contact with an outer peripheral surface of said rotatable member and wherein there is an increase in an amount of the lubricant at the position adjacent to said oil seal assembly as heat is generated at a sliding contact portion between said rotatable member and said oil assembly.

2. The structure of claim 1, wherein the oil seal assembly comprises:

a rubber member including a dust lip and a main lip which contacts the rotatable member;

a metal ring fixed to an outer surface of the rubber member and having an inverted L-shaped cross section with a ring engaging portion in an outer circumference of the metal ring;

a spring cover including a cover engaging portion fitted between the outer case and the ring engaging portion and having an inverted L-shaped cross section opposite to the inverted L-shaped cross section of the metal ring; and a gutter spring fitted around the main lip.

3. The structure of claim 2, wherein the spring cover includes a covering portion to which the lubricant-containing member is fixed.

4. The structure of claim 2, wherein the lubricant-containing member is fixed to the outer case.

5. The structure of claim 4, wherein the outer case includes a medium-diameter portion contacting the spring cover and fixing the lubricant-containing member, and the lubricant-containing member has an inside diameter which is equal to a diameter of the rotatable member and an outside diameter which is equal to an inside diameter of the medium-diameter portion.

6. The structure of claim 1, wherein the rotatable member and the outer case are metallic and the lubricant-containing member is electrically conductive.

7. The structure of claim 6, wherein the lubricant-containing member has a volume resistivity of at most $10^7$ $\Omega$·cm.

8. The structure of claim 6, wherein the lubricant-containing member is formed of the resinous material containing a conductive filler of at least one of:

a metallic material selected from the group consisting of silver, copper and aluminum;

a metallic oxide material selected from the group consisting of aluminum-doped zinc oxide, antimony-doped tin oxide coated barium sulfate, antimony-doped tin oxide coated aluminum borate, antimony-doped tin oxide coated titanium oxide, antimony-doped tin oxide, nitrogen-doped titanium oxide, antimony-doped tin oxide coated potassium titanate and carbon-coated potassium titanate; and a carbonaceous material selected from the group consisting of oil furnace black, acetylene black, graphite and carbon fibers.

9. The structure of claim 1, wherein the resinous material and the lubricant are mixed to form a mixture, and the mixture is molded into the annular shape.

* * * * *